(12) United States Patent
Soderlind et al.

(10) Patent No.: US 11,999,407 B1
(45) Date of Patent: Jun. 4, 2024

(54) TRANSLATING STEERING COLUMN WITH REDUCED PACKAGING SPACE

(71) Applicant: FORD GLOBAL TECHNOLOGIES, LLC, Dearborn, MI (US)

(72) Inventors: Erik William Soderlind, Harrison Township, MI (US); Taras Andrew Palczynski, Ann Arbor, MI (US); Steve Bryan Amburgy, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/112,135

(22) Filed: Feb. 21, 2023

(51) Int. Cl.
  B62D 1/185 (2006.01)
  B62D 5/00 (2006.01)

(52) U.S. Cl.
  CPC ............. B62D 1/185 (2013.01); B62D 5/006 (2013.01)

(58) Field of Classification Search
  CPC .......... B62D 1/185; B62D 1/19; B62D 1/192; B62D 5/006
  See application file for complete search history.

(56) References Cited

U.S. PATENT DOCUMENTS

| | | | |
|---|---|---|---|
| 10,457,314 B2 | 10/2019 | Swamidason | |
| 10,611,395 B2 | 4/2020 | Huber et al. | |
| 10,633,013 B2 | 4/2020 | Kreutz et al. | |
| 10,640,139 B2 | 5/2020 | Derocher et al. | |
| 10,882,548 B2 | 1/2021 | Freudenstein et al. | |
| 11,192,575 B2 | 12/2021 | Forte et al. | |
| 11,208,137 B2 | 12/2021 | Floerchinger et al. | |
| 11,383,756 B2 | 7/2022 | Ryne et al. | |
| 11,390,313 B2 * | 7/2022 | Kurokawa | B62D 1/192 |
| 2012/0085194 A1 * | 4/2012 | Inoue | B62D 1/185 74/493 |
| 2015/0375771 A1 * | 12/2015 | Tinnin | B62D 1/185 74/529 |
| 2019/0016376 A1 | 1/2019 | Sjenar et al. | |
| 2021/0347405 A1 | 11/2021 | Park et al. | |
| 2022/0073127 A1 | 3/2022 | Forte | |
| 2023/0257017 A1 * | 8/2023 | Wu | B62D 1/181 74/493 |

FOREIGN PATENT DOCUMENTS

| | | | | |
|---|---|---|---|---|
| CN | 207292112 U | * | 5/2018 | ............. B62D 1/181 |
| CN | 108025758 B | * | 11/2020 | ............. B62D 1/181 |
| CN | 113135219 A | * | 7/2021 | ............... B62D 1/16 |
| CN | 115210128 A | * | 10/2022 | ............. B62D 1/181 |
| CN | 115605391 A | * | 1/2023 | ............. B62D 1/181 |
| CN | 116353681 A | * | 6/2023 | |
| CN | 116353682 A | * | 6/2023 | |
| DE | 10033810 A1 | * | 1/2002 | ............. B62D 1/185 |

(Continued)

*Primary Examiner* — Drew J Brown
(74) *Attorney, Agent, or Firm* — Burr & Forman LLP; Lorne Forsythe

(57) ABSTRACT

A column for a handwheel actuator of a steer by wire system may include a column casting, a steering jacket operably coupled to the column casting such that the steering jacket moves telescopically within the column casting for extending the handwheel and retracting the handwheel, and a tunable stroke limiter operably coupled to the steering jacket to limit stroke length of the steering jacket responsive to a barrier event.

20 Claims, 7 Drawing Sheets

(56) References Cited

FOREIGN PATENT DOCUMENTS

| | | | | |
|---|---|---|---|---|
| DE | 102019214332 | A1 | 3/2021 | |
| EP | 3059139 | A1 * | 8/2016 | ............... B62D 1/16 |
| EP | 3476692 | A1 | 5/2019 | |
| EP | 3971055 | A1 | 3/2022 | |
| FR | 2834958 | A1 * | 7/2003 | ............. B62D 1/192 |

* cited by examiner

US 11,999,407 B1

TRANSLATING STEERING COLUMN WITH REDUCED PACKAGING SPACE

TECHNICAL FIELD

Example embodiments generally relate to vehicle control technology and, more particularly, relate to a steering column in a steer by wire system.

BACKGROUND

Vehicles are consistently moving toward the integration of electrical or electro-mechanical components that perform various vehicle functions that were previously performed using mechanical linkages. Drive-by-wire, steer-by-wire and brake-by-wire are some examples of this migration away from mechanical linkages. A result of this migration is that vehicles may become lighter, and easier to service and maintain.

With the advent of these changes, new options may arise for reimagining cabin design. In this regard, for example, more efficient packaging of components within the instrument panel, and in the zone of the steering wheel forward to the dash panel and/or pedals (e.g., accelerator and brake) may be desired.

BRIEF SUMMARY OF SOME EXAMPLES

In accordance with an example embodiment, a handwheel actuator for a steer by wire system may be provided. The handwheel actuator may include a column for operably coupling a handwheel to the handwheel actuator, and a feedback actuator operably coupled to the column. The feedback actuator may provide tactile feedback to an operator responsive to movement of the handwheel. The column may include a column casting, a steering jacket operably coupled to the column casting such that the steering jacket moves telescopically within the column casting for extending the handwheel and retracting the handwheel, and a tunable stroke limiter operably coupled to the steering jacket to limit stroke length of the steering jacket responsive to a barrier event.

In another example embodiment, a column for a handwheel actuator of a steer by wire system may be provided. The column may include a column casting, a steering jacket operably coupled to the column casting such that the steering jacket moves telescopically within the column casting for extending the handwheel and retracting the handwheel, and a tunable stroke limiter operably coupled to the steering jacket to limit stroke length of the steering jacket responsive to a barrier event.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
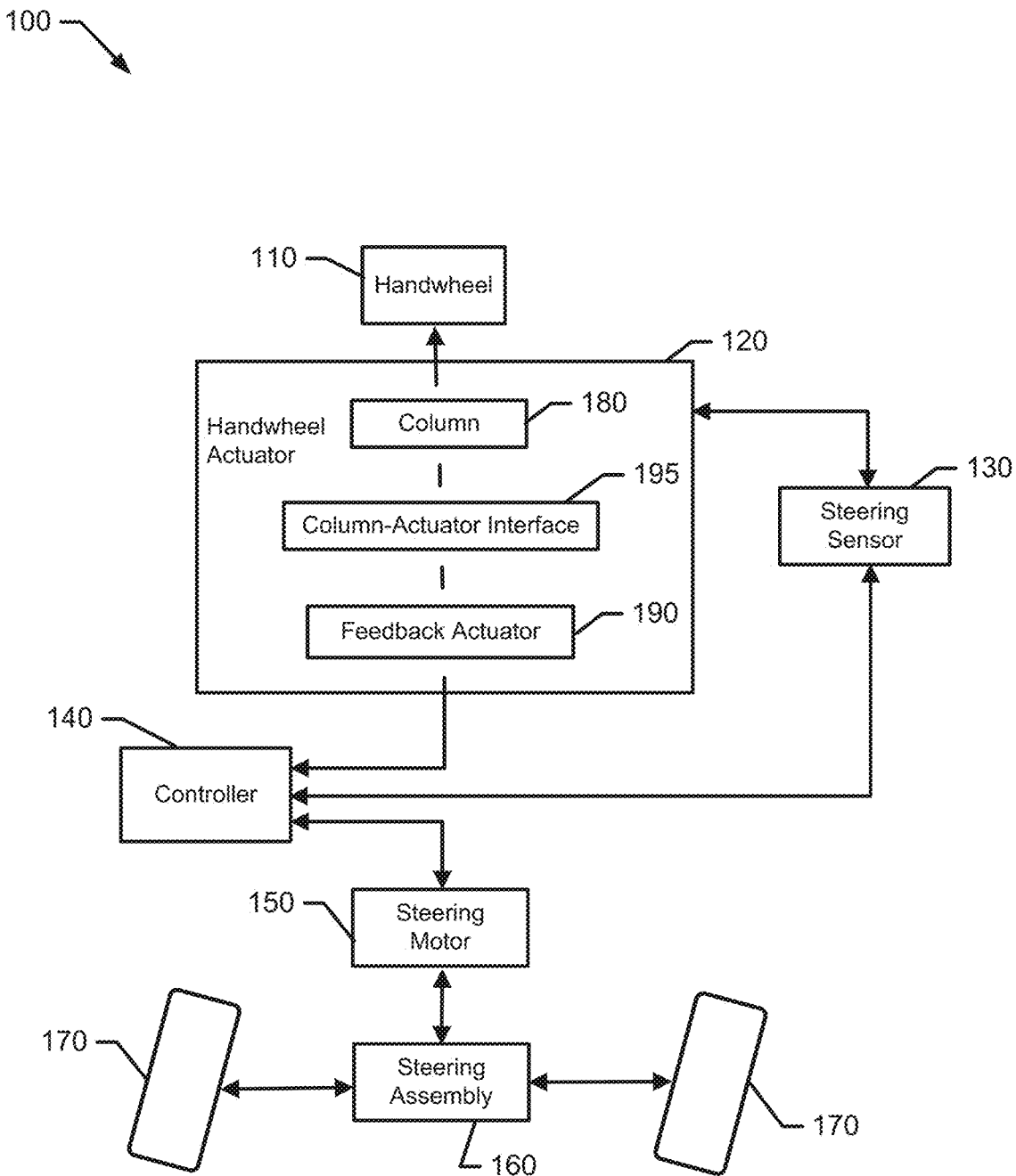
FIG. 1 illustrates a block diagram of a steer by wire system of a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to define more efficient cabin space utilization in vehicles that employ steer by wire technology. One aspect of this effort may include the ability to stow the steering wheel via telescopic steering column design strategies. Within this context, as stow distance is reduced, current architecture strategies tend to require the non-stowed column length to grow beyond the space available to package the steering column. Additionally, the increase in telescope or stow range may correspondingly increase the amount of moving mass during the telescoping process. During a barrier event with a column that has a higher moving mass, early column stroke may be initiated. In this regard, the moving mass may initiate column stroke (or translation) within milliseconds of the barrier event. Accordingly, example embodiments may provide a design advancement that minimizes column packaging space via a multi-segment translating steering column.

One example advancement contemplated herein may be associated with steer by wire systems, and may relate to the steering column of such a system. FIG. 1 illustrates a block diagram of some components of a steer by wire system 100 in accordance with an example embodiment. Of note, although the components of FIG. 1 may be part of or operably coupled to the vehicle, it should be appreciated that such connection(s) may be either direct or indirect. Moreover, some of the components of the steer by wire system 100 may be connected to the vehicle via intermediate connections to other components either of the chassis or of other electronic and/or mechanical systems or components.

Referring now to FIG. 1, the steer by wire system 100 may include a handwheel 110, which is located with a vehicle for manual manipulation by a driver or operator of the vehicle. The handwheel 110 is typically a traditional steering wheel, and therefore may be round and rotatable about an axis. However, other structures could be substituted for implementation as the handwheel 110 in alternative embodiments. The movements (typically rotations) of the handwheel 110 are communicated to a handwheel actuator 120 that is operably coupled to the handwheel 110. The handwheel 110 and/or the handwheel actuator 120 may also be operably coupled to one or more steering sensors 130 that may be configured to determine steering angle and/or torque input at the handwheel 110. In some cases, the steering sensor 130 (or sensors) may be part of the handwheel actuator 120. However, the steering sensor 130 could alternatively be a separate component.

In an example embodiment, the handwheel actuator 120 and/or the steering sensor 130 may be operably coupled to a controller 140. In some cases, the controller 140 may be part of an electronic control system of the vehicle. The controller 140 may therefore also be configured to perform other tasks related or not related to steer by wire control or performance management. However, the controller 140 could be a dedicated or standalone controller in some cases. Processing circuitry (e.g., a processor and memory) at the controller 140 may process the information received by, for example, running one or more control algorithms based on the information received. The control algorithms may include instructions that can be stored by the memory for retrieval and execution by the processor. In some cases, the memory may further store one or more tables (e.g., look up tables) and various calculations and/or applications may be executed using information in the tables and/or the information to generate outputs to a steering motor 150 based on the inputs received (e.g., from the handwheel actuator 120 and/or steering sensor 130).

In an example embodiment, the steering motor 150 (or steering actuator) may be an electrical motor that is operably coupled to a steering assembly 160 to drive the steering assembly 160 to turn wheels 170 (typically front wheels) of the vehicle. The steering assembly 160 may include one or more of a chain, flexible looped drive member, steering gear(s), rack and pinion, direct drive, or other structures that communicate steering torque to the wheels 170.

In an example embodiment, the handwheel actuator 120 may include subcomponents that may be made by different manufacturers, suppliers or sourcing agents, which are often simply referred to as original equipment manufacturers (OEMs). In this regard, for example, the handwheel actuator 120 may include a column 180 and a feedback actuator 190. The column 180 may include structural interfaces to the handwheel 110 to enable the rotational inputs at the handwheel 110 to be communicated to the controller 140 for generation of inputs to the steering motor 150. The feedback actuator 190 may include an electric motor and other components that are designed to provide feedback that gives operators a tactile response similar to that of conventional mechanical or hydraulic steering systems.

As noted above, the use of the handwheel actuator 120 creates significant flexibility in terms of enabling designers to easily change steering ratios and torque resistances or otherwise modify steering functionality. In this regard, for example, relatively simple software commands may enable such alteration instead of any physical component replacement or manipulation. Additionally, by not mechanically linking the handwheel 110 to the wheels 170, greater flexibility is unlocked in terms of other aspects of vehicle design, including stowable handwheels and/or steering columns for self-driving options coming in the future.

Although it may be possible for the entire handwheel actuator 120 to be manufactured by a single OEM, the nature of competition in the global automotive sector, and the fact that different areas of specialization may be required to manufacture the column 180 than those required for manufacture of the feedback actuator 190, may dictate that different OEMs could be used for each part. Moreover, the fact that it may be desirable to have the column 180 and the feedback actuator 190 be separate serviceable and individually replaceable components so that service life exhaustion of one does not necessitate replacement of the other tends to motivate the modularization of the column 180 and the feedback actuator 190 as separate modules or components with an interface (e.g., a column-actuator interface 195) therebetween. However, as noted above, the column-actuator interface 195 could be obviated in designs that integrate the feedback actuator 190 directly with the column 180.

For normal driving comfort of the driver, the handwheel 110 may have an ability to move about +/−30 mm, and telescopic translation capability may be provided for about 150 mm of translation. However, in a barrier event, it may be desirable to reduce the distance traveled based on the interior cabin space of the vehicle, which may in part be defined based on an occupant to windshield displacement. To provide this capability, various different structures may be employed. FIGS. 2-7 demonstrate some specific structures that may be used to implement various aspects of the steer by wire system 100 of FIG. 1, which is modified to provide the capability noted above.

Figure 2:
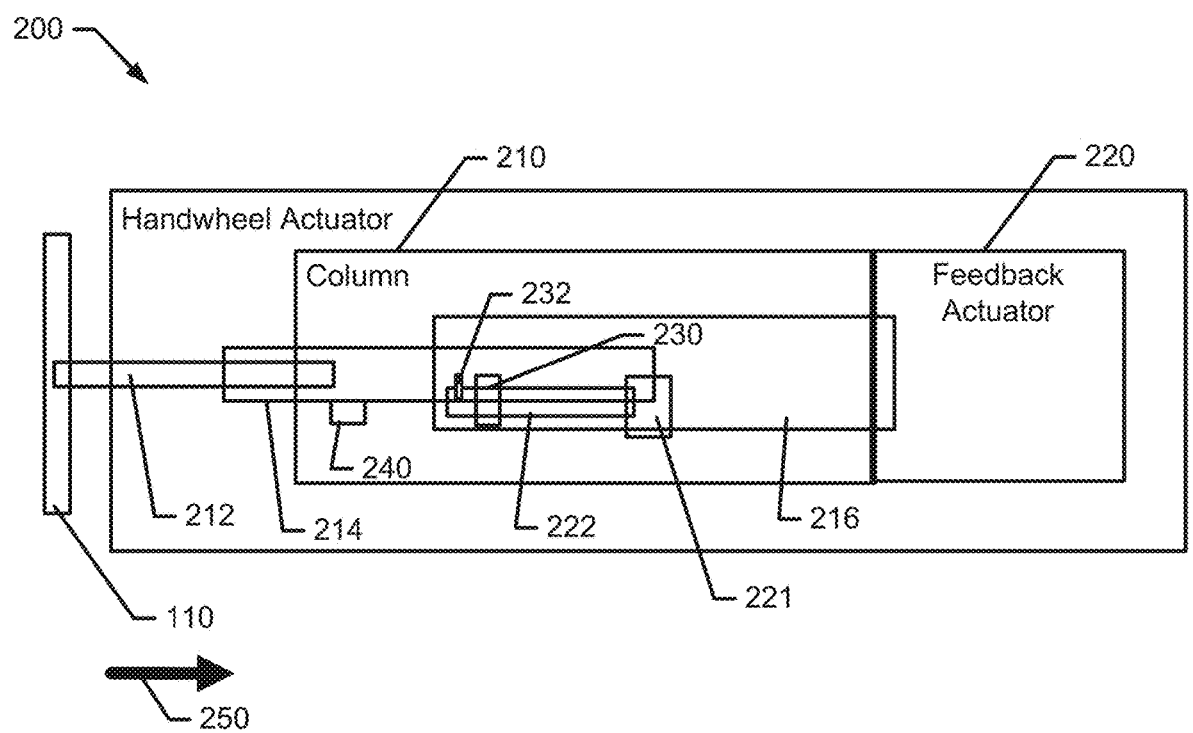
FIG. 2 illustrates a schematic view of a handwheel actuator in accordance with an example embodiment.
Figure 3:
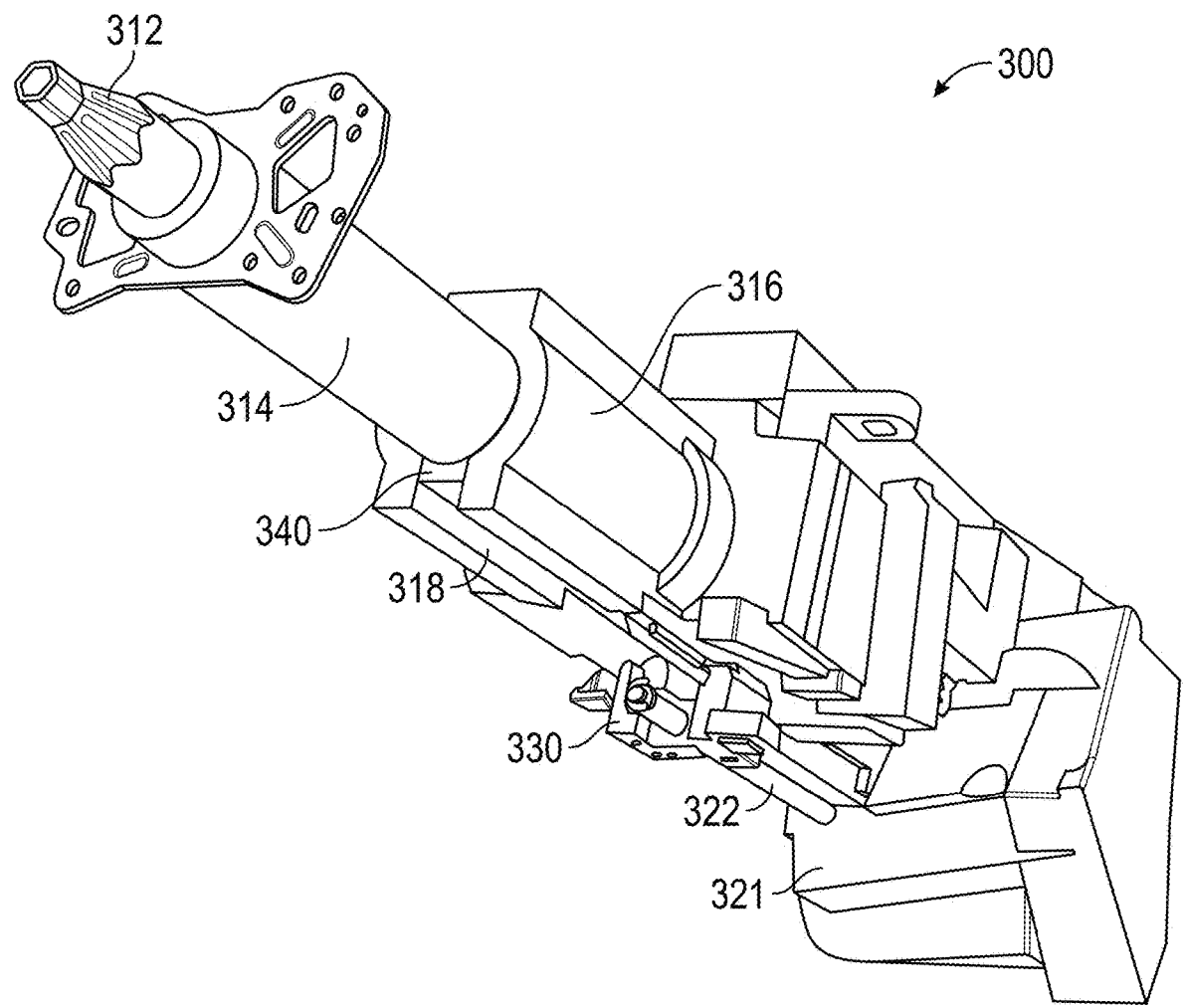
FIG. 3 shows a rear (from the perspective of the vehicle) perspective view of various components and structures that may define portions of a column in accordance with an example embodiment.
Figure 4:
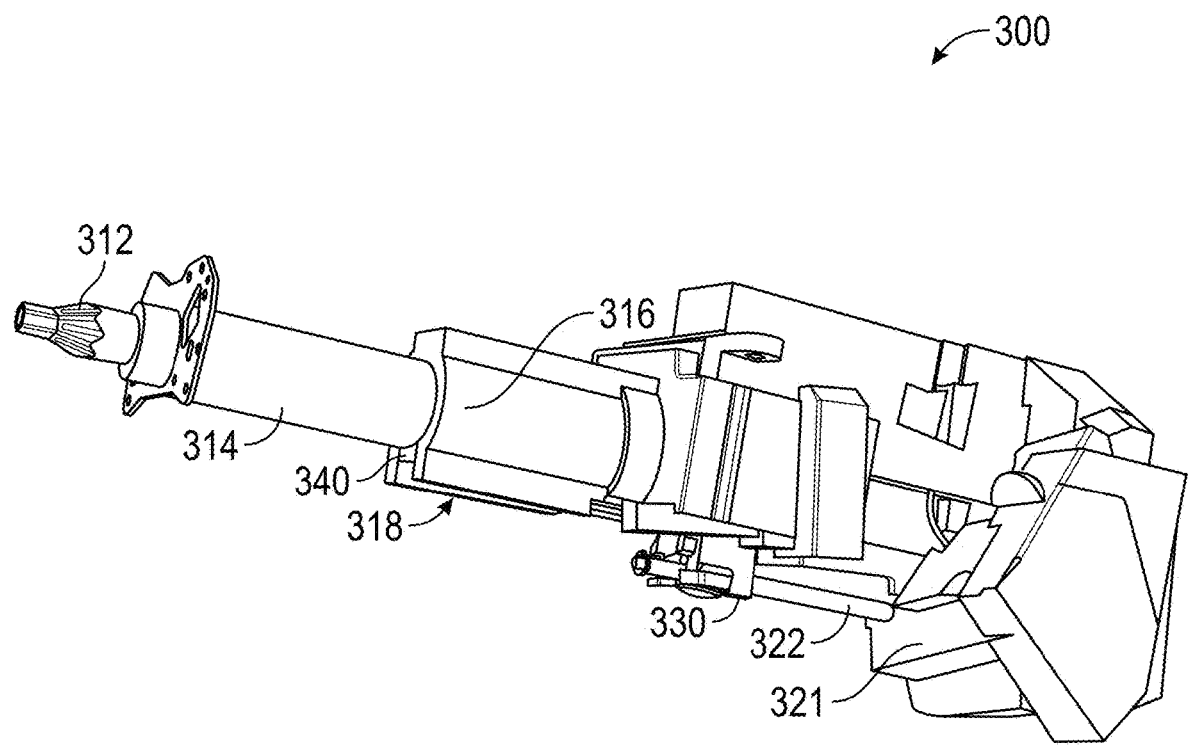
FIG. 4 is a side perspective view of the column in accordance with an example embodiment.
Figure 5:
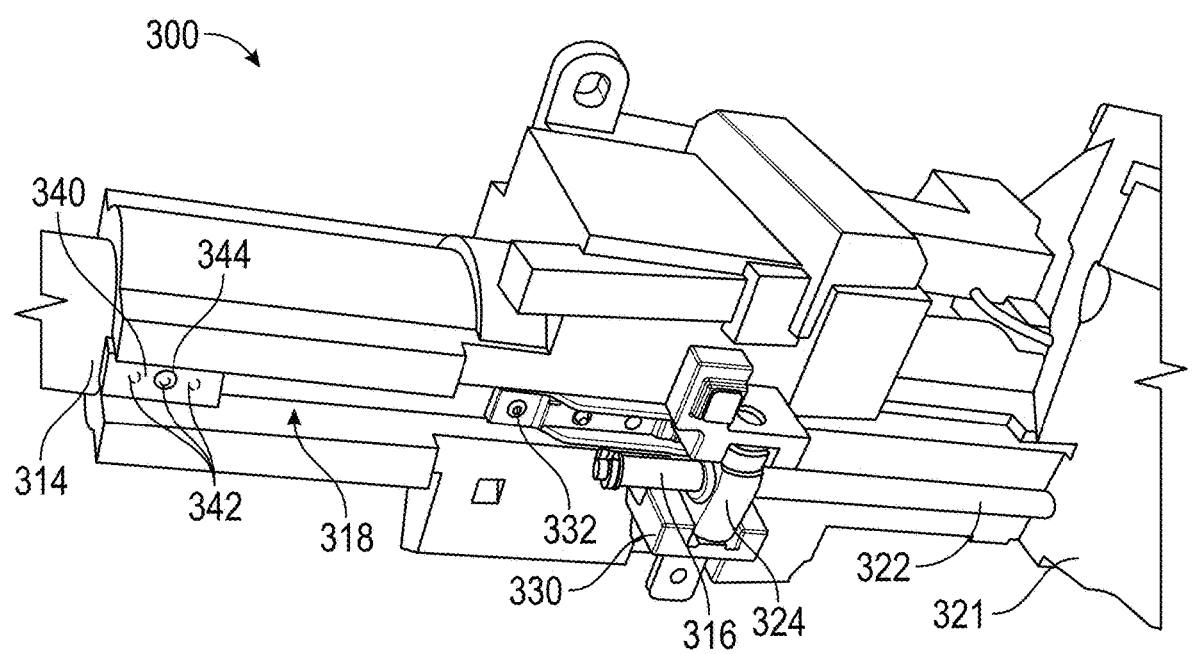
FIG. 5 is a perspective view of a channel of a column casting and various components related thereto in accordance with an example embodiment.
Figure 6:
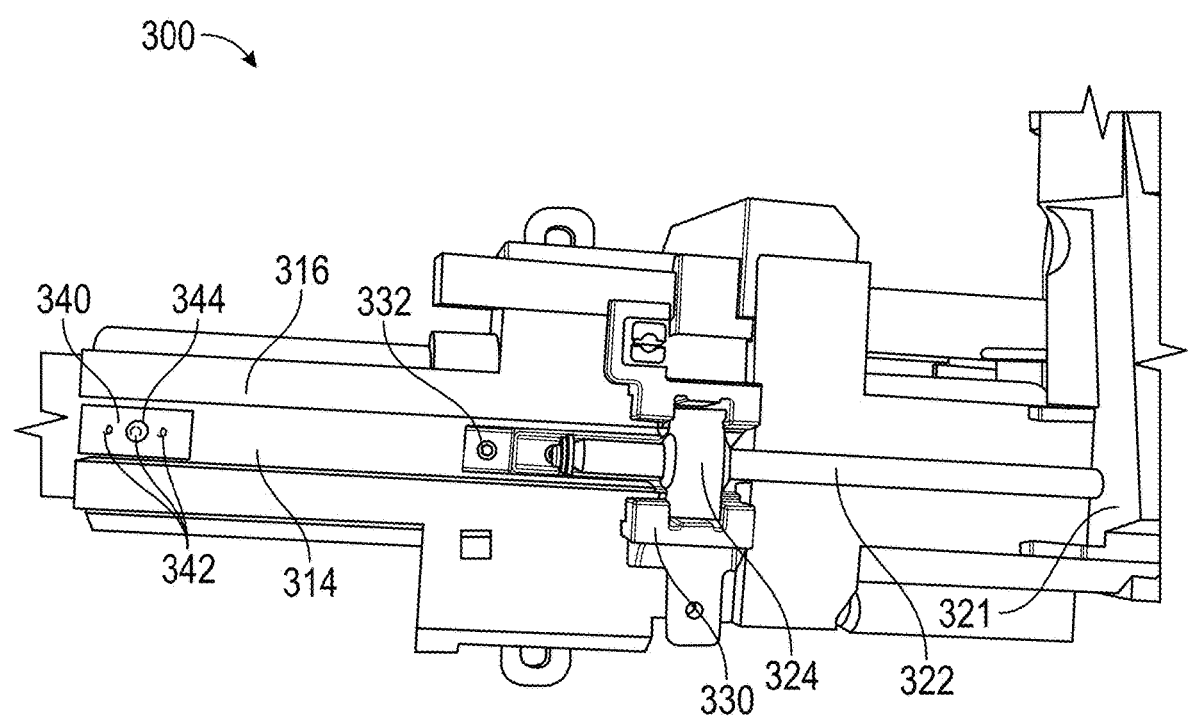
FIG. 6 is a bottom view of the channel and its environs in accordance with an example embodiment.
Figure 7:
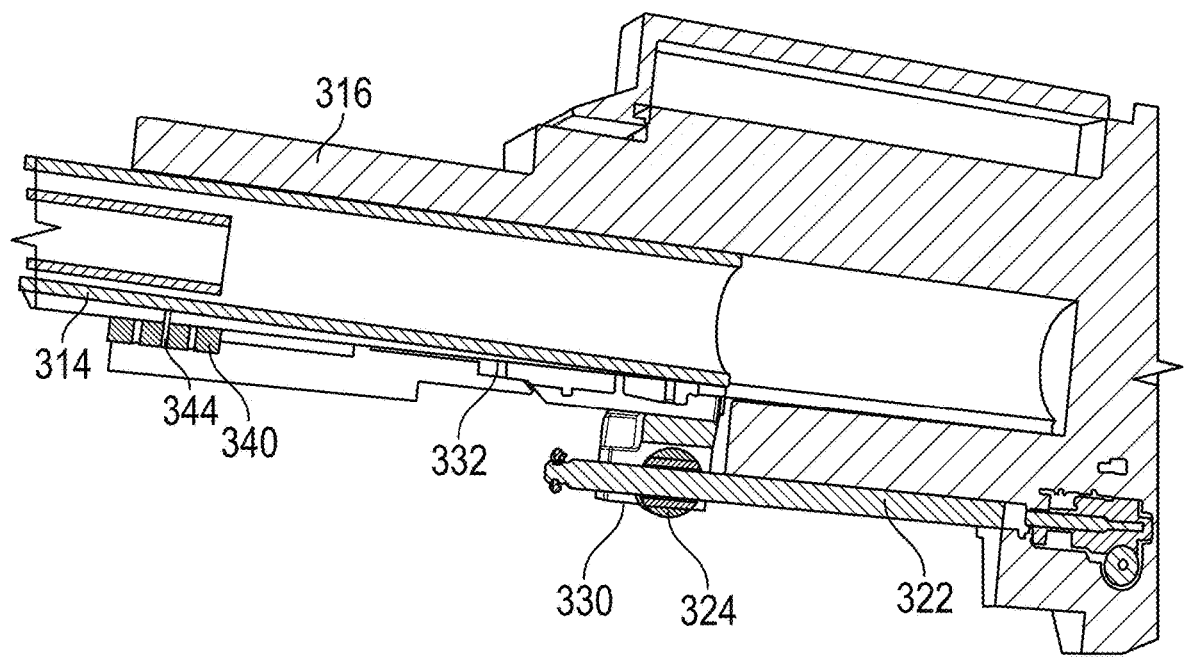
FIG. 7 is a partial cross section view of the column in accordance with an example embodiment.

Turning first to FIG. 2, a schematic view of a handwheel actuator 200, which may be an example of the handwheel actuator 120 of FIG. 1, is shown. In FIG. 2, a column portion (or column 210) and feedback actuator portion (or feedback actuator 221) may be understood to be separable modules or component that may be joined at an interface therebetween. The column 210 is an example of the column 180, and the feedback actuator 221 is an example of the feedback actuator 190 of FIG. 1. The column 210 may include a steering shaft 212 that may be supported or held in place by a steering jacket 214. The steering jacket 214 may be operably coupled to a column casting 216. The steering jacket 214 and the column casting 216 may combine to form a housing of the column 210. The steering shaft 212 may be operably coupled to a handwheel (e.g., handwheel 110) at one end (i.e., a proximal end), and may be operably coupled to the steering jacket 214 at the opposing end (i.e., a distal end thereof relative to the handwheel 110).

In an example embodiment, steering shaft 212 may be operably coupled to the steering jacket 214, e.g., via a bearing to permit the steering shaft 212 to rotate within the steering jacket 214. Meanwhile, the steering jacket 214 may be operably coupled to the column casting 216 in such a way that permits the steering jacket 214 to slide into and out of the column casting 216 (e.g., telescopically retracting and extending, respectively). As such, a degree to which the steering jacket 214 can move within the column casting 216 may define how much movement of the handwheel 110 may be possible between fully extended and fully retracted conditions. In some embodiments, as mentioned above, that movement amount may be about 150 mm. However, additional telescoping stages may be defined in some embodiments, and additional movement for such stages (or segmentation of the movement noted above amongst the stages) may correspondingly also be provided.

In some embodiments, a telescopic motor and actuator 221 may be provided to carry the steering jacket 214 relative to the column casting 216 responsive to rotation of the telescopic motor and actuator 221. The carrying discussed above may be accomplished via a shaft 222 that is operably coupled to the telescopic motor and actuator 221 at one end thereof, and to the steering jacket 214 at the other end thereof. The shaft 222 may be retained in position via a telescopic drive bracket 230, and operably coupled to the steering jacket 214 via a shear rivet 232. Neither the telescopic drive bracket 230 nor the telescopic motor and actuator 221 (which may be hard mounted onto the column casting 216) may move in a barrier event. However, the steering jacket 214 will move in a barrier event, and controlling its movement, and generally the total amount of mass that moves in such a barrier event, and the force at which such movement begins may be desirable. In order to provide such control, example embodiments may further include a tunable stroke limiter 240.

The stroke limiter 240 may be operably coupled to the steering jacket 214 at a selected location thereof, and may limit the movement of the steering jacket 214 in response to a barrier event by virtue of encountering the telescopic drive bracket 230 after the shear rivet 232 breaks or shears when a predetermined amount of force is encountered (e.g., via input of such force onto the handwheel 110). In this regard, for example, the shear rivet 232 may be designed to shear at the predetermined amount of force, which in some embodiments may be in a range of between 1.5 kN to 3.5 kN. Once the shear rivet 232 has sheared or broken, the steering jacket 214 will translate in the direction of arrow 250 until the stroke limiter 240 contacts the telescopic drive bracket 230. Thus, the original location of the stroke limiter 240 may be selected, or tuned, to determine the amount of movement of the steering jacket 214 that is allowed, thereby providing a tunable (e.g., based on selection of the location of mounting of the stroke limiter 240 on the steering jacket 214) limit to the translation of the steering jacket 214. To facilitate this tuning capability, the stroke limiter 240 may have multiple selectable mounting locations on the steering jacket 214. Any one of the multiple selectable mounting locations may be selected to define the translation or movement length of the stroke that is resultantly permitted.

Of note, as mentioned above, some example embodiments may further include other stages that may move (and limit movement) independent of or in sequence with the stage described above. Each such stage may have its own motor and actuator moving a corresponding jacket stage relative to another component. In such cases, the column 210 may be understood to employ its own additional energy management systems and reduce any abrupt contact caused by the stroke limiter 240. However, such additional stages, if added, are beyond the scope of this disclosure.

As can be appreciated from the discussion above, the components shown in FIG. 2 may be embodied in various different structures. FIGS. 3-7 illustrate one example set of structures that may be used to implement the components of FIG. 2. Referring now to FIGS. 3-7, a handwheel actuator 300, which may be an example of the handwheel actuator 200 of FIG. 2, is shown. The handwheel actuator 300 includes a steering shaft 312, steering jacket 314 and a column casting 316. The steering shaft 312 may be operably coupled to the steering jacket 314, as described above. Meanwhile, the steering jacket 314 may in turn move telescopically within the column casting 316, as also described above. Portions of the steering jacket 314 that are within the column casting 316 may be substantially surrounded by the column casting 316 except over a small portion of the steering jacket 314 that may be exposed by virtue of a channel 318 formed in the column casting 316. In the depicted example, the channel 318 is formed at a bottom portion of the column casting 316, but other locations (e.g., top or side) may be employed in other alternative embodiments.

A telescopic motor and actuator 321 may be provided to carry the steering jacket 314 relative to the column casting 316 responsive to rotation of the telescopic motor and actuator 321, as described above. In this regard, a shaft 322 may be rotated to translate a coupling member 324 (e.g., a threaded nut, or the like) through which the shaft 322 passes along the shaft 322 responsive to rotation of the shaft 322. The coupling member 324 may in turn be operably coupled to (and carry) a telescopic drive bracket 330 that is operably coupled to the steering jacket 314 via a shear rivet 332. As noted above, the shear rivet 332 may be designed to shear or break if subjected to a predetermined range of forces. Thus, for example, in some cases the predetermined range of forces may be at about 1.5 kN to 3.5 kN of force exerted on the shear rivet 332.

A stroke limiter 340 is attached to the steering jacket 314 at one of a plurality of selectable locations 342 (indicated by dashed circles since a view of their respective locations is actually obstructed by the stroke limiter 340). Each of the selectable locations 342 is a corresponding different distance away from the telescopic drive bracket 330, which would form the limit of travel for the stroke limiter 340 and therefore also the steering jacket 314 in response to a mass contacting the handwheel 110 in a barrier event. Choosing one of the selectable locations 342 as an anchoring point, a fastener 344 (e.g., a screw, bolt, rivet, weld joint, etc.) may be provided to be affixed at or to the selected one of the selectable locations 342 to define the distance the stroke limiter 340 travels responsive to the barrier event. This limiting action is therefore a limit to the length of the stroke, and is also tunable in that the length can be tuned by selecting different lengths (and a corresponding different one of the selectable locations 342). The length of the stroke may be limited to something less than the 150 mm of maximum extension that is otherwise enabled and, in some cases, may be about ⅔ of the maximum extension length (e.g., about 100 mm).

The stroke limiter 340 may have a width that is slightly less than a width of the channel 318. Meanwhile, the channel 318 may extend inwardly from a distal end of the column casting 316 (i.e., the end closest to the steering jacket 314) parallel to an axis of the steering jacket 314. The length of the channel 318 may also, in some cases, represent the maximum theoretical stroke length that is possible for the stroke limiter 340. In this regard, it may be desirable to ensure that the stroke limiter 340 remains in the channel 318 so that no alignment issues come into play of the stroke limiter 340 were otherwise to extend out of the channel 318 when at maximum extension, and need to be aligned with the channel 318 for retraction (or a barrier event). Using the structures described herein, a limitation to the stroke length as well as control over the mass and components that move during the stroke in response to a barrier event can all be controlled. Moreover, as noted above, although this example is employed in the context of a single telescoping stage, it could be duplicated over multiple stages if desired.

Example embodiments may therefore also provide a handwheel actuator for a steer by wire system. The handwheel actuator may include a column for operably coupling a handwheel to the handwheel actuator, and a feedback actuator operably coupled to the column. The feedback actuator may provide tactile feedback to an operator responsive to movement of the handwheel. The column may include a column casting, a steering jacket operably coupled to the column casting such that the steering jacket moves telescopically within the column casting for extending the handwheel and retracting the handwheel, and a tunable stroke limiter operably coupled to the steering jacket to limit stroke length of the steering jacket responsive to a barrier event.

The column of some embodiments (or handwheel actuator including such column) may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the column casting may include a channel extending parallel to an axis of the steering jacket, and the stroke limiter may be disposed in the channel during extension and retraction of the handwheel. In an example embodiment, the column may further include a telescopic motor that turns a shaft that is operably coupled to the steering jacket via a shear member that shears or brakes at a predetermined threshold force in response to the barrier event to enable the steering jacket to retract into the column casting by the stroke length. In some cases, the stoke length may be less than about 150 mm. In an example embodiment, the stroke limiter may be attached to the steering jacket at one of a plurality of selectable locations via a fastener, and each of the selectable locations may define a respective different stroke length. In this context, a selected one of the each of the selectable locations may define the stroke length for tuning the stroke limiter. In some embodiments, the shear member may shear or break at a force of a predetermined range (e.g., about 1.5 kN to 3.5 kN). In an example embodiment, the shaft may be supported at least in part by a telescopic drive bracket, and the telescopic drive bracket may contact and stop motion of the stroke limiter to define the stroke length as a distance between the stroke limiter and the telescopic drive bracket. In some cases, the telescopic drive bracket may be operably coupled to a coupling member that is operably coupled to the shaft to enable extension of the steering jacket responsive to rotation of the shaft by the telescopic motor. In an example embodiment, the handwheel may be operably coupled to the steering jacket via a steering shaft, and the steering shaft may be extendable by about 30 mm relative to the steering jacket. In some cases, the stroke limiter may have a width about equal to, but smaller than, a width of the channel, and the stroke limiter may remain in the channel over a full range of motion of the stroke limiter.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A column for a handwheel actuator of a steer by wire system, the column comprising:
    a column casting;
    a steering jacket operably coupled to the column casting such that the steering jacket moves telescopically within the column casting for extending the handwheel and retracting the handwheel; and
    a tunable stroke limiter operably coupled to the steering jacket to limit stroke length of the steering jacket responsive to a barrier event.

2. The column of claim 1, wherein the column casting comprises a channel extending parallel to an axis of the steering jacket, and
    wherein the stroke limiter is disposed in the channel during extension and retraction of the handwheel.

3. The column of claim 2, further comprising a telescopic motor that turns a shaft operably coupled to the steering jacket via a shear member that shears or brakes at a predetermined threshold force in response to the barrier event to enable the steering jacket to retract into the column casting by the stroke length.

4. The column of claim 3, wherein the stoke length is less than about 150 mm.

5. The column of claim 3, wherein the stroke limiter is attached to the steering jacket at one of a plurality of selectable locations via a fastener, each of the selectable locations defining a respective different stroke length, and
    wherein a selected one of the each of the selectable locations defines the stroke length for tuning the stroke limiter.

6. The column of claim 3, wherein the shear member shears or breaks at a force of a predetermined range.

7. The column of claim 3, wherein the shaft is supported at least in part by a telescopic drive bracket, and
    wherein the telescopic drive bracket contacts and stops motion of the stroke limiter to define the stroke length as a distance between the stroke limiter and the telescopic drive bracket.

8. The column of claim 7, wherein the telescopic drive bracket is operably coupled to a coupling member that is operably coupled to the shaft to enable extension of the steering jacket responsive to rotation of the shaft by the telescopic motor.

9. The column of claim 3, wherein the handwheel is operably coupled to the steering jacket via a steering shaft, and
    wherein the steering shaft is extendable by about 30 mm relative to the steering jacket.

10. The column of claim 2, wherein the stroke limiter has a width about equal to, but smaller than, a width of the channel, and
    wherein the stroke limiter remains in the channel over a full range of motion of the stroke limiter.

11. A handwheel actuator for a steer by wire system, the handwheel actuator comprising:
    a column for operably coupling a handwheel to the handwheel actuator; and
    a feedback actuator operably coupled to the column, the feedback actuator providing tactile feedback to an operator responsive to movement of the handwheel,
    wherein the column comprises:

a column casting;

a steering jacket operably coupled to the column casting such that the steering jacket moves telescopically within the column casting for extending the handwheel and retracting the handwheel; and a tunable stroke limiter operably coupled to the steering jacket to limit stroke length of the steering jacket responsive to a barrier event.

12. The handwheel actuator of claim 11, wherein the column casting comprises a channel extending parallel to an axis of the steering jacket, and wherein the stroke limiter is disposed in the channel during extension and retraction of the handwheel.

13. The handwheel actuator of claim 12, wherein the column further comprises a telescopic motor that turns a shaft operably coupled to the steering jacket via a shear member that shears or brakes at a predetermined threshold force in response to the barrier event to enable the steering jacket to retract into the column casting by the stroke length.

14. The handwheel actuator of claim 13, wherein the stoke length is less than about 150 mm.

15. The handwheel actuator of claim 13, wherein the stroke limiter is attached to the steering jacket at one of a plurality of selectable locations via a fastener, each of the selectable locations defining a respective different stroke length, and wherein a selected one of the each of the selectable locations defines the stroke length for tuning the stroke limiter.

16. The handwheel actuator of claim 13, wherein the shear member shears or breaks at a force of a predetermined range.

17. The handwheel actuator of claim 13, wherein the shaft is supported at least in part by a telescopic drive bracket, and wherein the telescopic drive bracket contacts and stops motion of the stroke limiter to define the stroke length as a distance between the stroke limiter and the telescopic drive bracket.

18. The handwheel actuator of claim 17, wherein the telescopic drive bracket is operably coupled to a coupling member that is operably coupled to the shaft to enable extension of the steering jacket responsive to rotation of the shaft by the telescopic motor.

19. The handwheel actuator of claim 13, wherein the handwheel is operably coupled to the steering jacket via a steering shaft, and wherein the steering shaft is extendable by about 30 mm relative to the steering jacket.

20. The handwheel actuator of claim 12, wherein the stroke limiter has a width about equal to, but smaller than, a width of the channel, and wherein the stroke limiter remains in the channel over a full range of motion of the stroke limiter.

\* \* \* \* \*